United States Patent [19]

Sanda et al.

[11] 4,180,044
[45] Dec. 25, 1979

[54] TORCH IGNITION TYPE INTERNAL COMBUSTION ENGINE

[75] Inventors: Shougo Sanda, Okazaki; Noriniko Nakamura, Mishima; Toshio Tanahashi, Toyota, all of Japan

[73] Assignee: Toyota Jidosha Kogyo Kabushiki Kaisha, Toyota, Japan

[21] Appl. No.: 931,293

[22] Filed: Aug. 4, 1978

Related U.S. Application Data

[63] Continuation of Ser. No. 864,013, Dec. 23, 1977, abandoned, which is a continuation of Ser. No. 689,128, May 24, 1976, abandoned.

[30] Foreign Application Priority Data

Nov. 10, 1975 [JP] Japan .................................. 50-134133

[51] Int. Cl.² .............................................. F02B 19/16
[52] U.S. Cl. ............................ 123/191 S; 123/32 SP; 123/191 SP
[58] Field of Search ................ 123/30 D, 32 C, 32 K, 123/32 L, 32 ST, 32 SP, 191 S, 191 SP, 191 R

[56] References Cited

U.S. PATENT DOCUMENTS

| | | | |
|---|---|---|---|
| 3,776,212 | 12/1973 | Karlowitz | 123/32 SP |
| 3,830,205 | 8/1974 | Date et al. | 123/32 SP |
| 3,890,942 | 6/1975 | Date et al. | 123/191 SP |
| 3,910,248 | 10/1975 | Nakagawa et al. | 123/191 S |
| 3,968,782 | 7/1976 | Noguchi et al. | 123/32 SP |
| 3,980,057 | 9/1976 | Sanda et al. | 123/191 S |
| 3,987,765 | 10/1976 | Sato et al. | 123/191 SP |
| 3,991,725 | 11/1976 | Nakagawa et al. | 123/32 SP |
| 4,000,731 | 1/1977 | Noguchi et al. | 123/191 S |
| 4,004,563 | 1/1977 | Nakamura et al. | 123/32 SP |
| 4,041,909 | 8/1977 | Nakamura | 123/191 SP |
| 4,048,973 | 9/1977 | Sanda et al. | 123/191 SP |
| 4,059,079 | 11/1977 | Kasima et al. | 123/32 SP |

*Primary Examiner*—Charles J. Myhre
*Assistant Examiner*—Craig R. Feinberg
*Attorney, Agent, or Firm*—Stevens, Davis, Miller & Mosher

[57] ABSTRACT

A torch ignition type internal combustion engine with no intake valve in the auxiliary combustion chamber, the engine comprising: a cylinder; a cylinder head; a reciprocating piston received snugly in the cylinder; a main combustion chamber defined between said cylinder head and an end face of the reciprocating piston and having intake and exhaust valves to control intake and exhaust ports in the cylinder head; an auxiliary combustion chamber provided in the head of the cylinder; a passage interconnecting said main and auxiliary combustion chambers; and an ignition plug having sparking electrodes located in said passage; the auxiliary combustion chamber having a volume of a ratio within the range of 0.0106:1 to 0.0137:1 with respect to the volume of displacement of the piston, the passage having a cross-sectional area of a ratio within the range of 0.009:1 to 0.023:1 with respect to the cross-sectional area of the end face of the piston and the engine having a compression ratio within the range of 8.0 to 9.5.

3 Claims, 4 Drawing Figures

TORCH IGNITION TYPE INTERNAL COMBUSTION ENGINE

This is a continuation of application Ser. No. 864,013 filed Dec. 23, 1977 now abandoned which in turn is a continuation of application Ser. No. 689,128 filed May 24, 1976 now abandoned.

BACKGROUND OF THE INVENTION

1. Field of the Invention

This invention relates to a torch ignition type internal combustion engine, and more particularly to a torch ignition type internal combustion engine which has no intake valve in the auxiliary combustion chamber.

2. Description of Prior Art

It is well known in the art to burn a rather lean air-fuel mixture in the engine cylinder in order to reduce the toxic components such as carbon monoxide, hydrocarbons and nitrogen oxides which are usually present in the engine exhaust. A lean air-fuel mixture, however, has inferior ignition properties and inferior flame propagation velocity, allowing raw air-fuel mixture to blow by to the exhaust manifold and causing reductions in the cyclic thermal efficiency.

In order to overcome the aforementioned difficulty, there has been introduced the so-called torch ignition type internal combustion engine which has a main combustion chamber with an intake valve and an exhaust valve, and an auxiliary combustion chamber with an intake valve, the engine being adapted to supply a lean air-fuel mixture to the main combustion chamber and a relatively rich mixture to the auxiliary combustion chamber through the respective intake valves. In such an engine system, the relatively rich air-fuel mixture in the auxiliary combustion chamber is first ignited and burned, the flames bursting from the auxiliary combustion chamber subsequently igniting the lean air-fuel mixture in the main combustion chamber. This internal combustion engine with an intake valve in the auxiliary combustion chamber has its own merits in that it ensures combustion of the lean air-fuel mixture and high flame propagation velocity. On the other hand, such internal combustion engine invariably has complicated construction due to the requirement for the provision of the intake valve in the auxiliary combustion chamber. Such a valve requires a complicated valve operating mechanism for opening and closing the same at a predetermined timing.

A torch ignition type internal combustion engine has previously been proposed which comprises a main combustion chamber with an intake valve and an exhaust valve, an auxiliary combustion chamber with no intake valve, a passage interconnecting the main and auxiliary combustion chambers, and an ignition plug having its sparking electrodes located in the auxiliary combustion chamber and in the vicinity of the interconnecting passage. In this torch ignition type internal combustion engine, a lean air-fuel mixture inhaled into the main combustion chamber through the intake valve during the intake stroke of the piston is urged into the auxiliary combustion chamber during the succeeding compression stroke through the passage interconnecting the main and auxiliary combustion chambers. Now that there is only fresh air-fuel mixture surrounding the sparking elctrodes of the ignition plug which is located in the auxiliary combustion chamber in a position near the passage, the lean air-fuel mixture within the auxiliary combustion chamber is ignited and burned without material interference from the exhaust which might be still remaining in the auxiliary chamber, followed by ignition of the lean air-fuel mixture in the main combustion chamber by the flames bursting out from the auxiliary combustion chamber.

With the above-described torch ignition type internal combustion engine with no intake valve in the auxiliary combustion chamber, it is necessary to reliably ignite and burn the lean air-fuel mixture passed into the auxiliary combustion chamber through the interconnecting passage. To this end, it is necessary to control the velocity and amount of the lean air-fuel mixture passed into the auxiliary combustion chamber through the interconnecting passage.

SUMMARY OF THE INVENTION

It is an object of the present invention to provide a torch ignition type internal combustion engine which has no intake valve in the auxiliary combustion chamber and which can ensure stabilized ignition and combustion under varied operating conditions of the engine.

It is another object of the present invention to provide a torch ignition type internal combustion engine of the nature mentioned above, which can substantially reduce the content of toxic compounds in the engine exhaust, including carbon monoxide, hydrocarbons and nitrogen oxides while achieving high thermal efficiency.

Still another object of the invention resides in the provision of a torch ignition type internal combustion engine of the type mentioned above which avoids and effectively eliminates the disadvantages encountered with the prior art constructions.

It is a further object of the invention to provide a torch ignition type internal combustion engine which is simple in construction and reliable in operation.

According to the present invention, there is provided a torch ignition type internal combustion engine which has no intake valve in the auxiliary combustion chamber and which comprises a cylinder; a cylinder head; a main combustion chamber defined between said cylinder head and an end face of said reciprocating piston and having intake and exhaust valves to control intake and exhaust ports in said cylinder head; an auxiliary combustion chamber provided at a suitable position on the cylinder head; a passage interconnecting said main and auxiliary combustion chambers; and an ignition plug having sparking electrodes located in said passage; said auxiliary combustion chamber having a volume of a ratio within the range of 0.0106:1 to 0.0137:1 with respect to the volume of displacement of said piston, said passage having a cross-sectional area of a ratio within the range of 0.009:1 to 0.023:1 with respect to the cross-sectional area of said end face of said piston and the engine having a compression ratio being set within the range of 8.0 to 9.5.

The above and other objects, features and advantages of the invention will become clear from the following particular description of the invention and the appended claims, taken in conjunction with the accompanying drawings which show by way of example a preferred embodiment of the present invention.

PARTICULAR DESCRIPTION OF THE INVENTION

Figure 1:
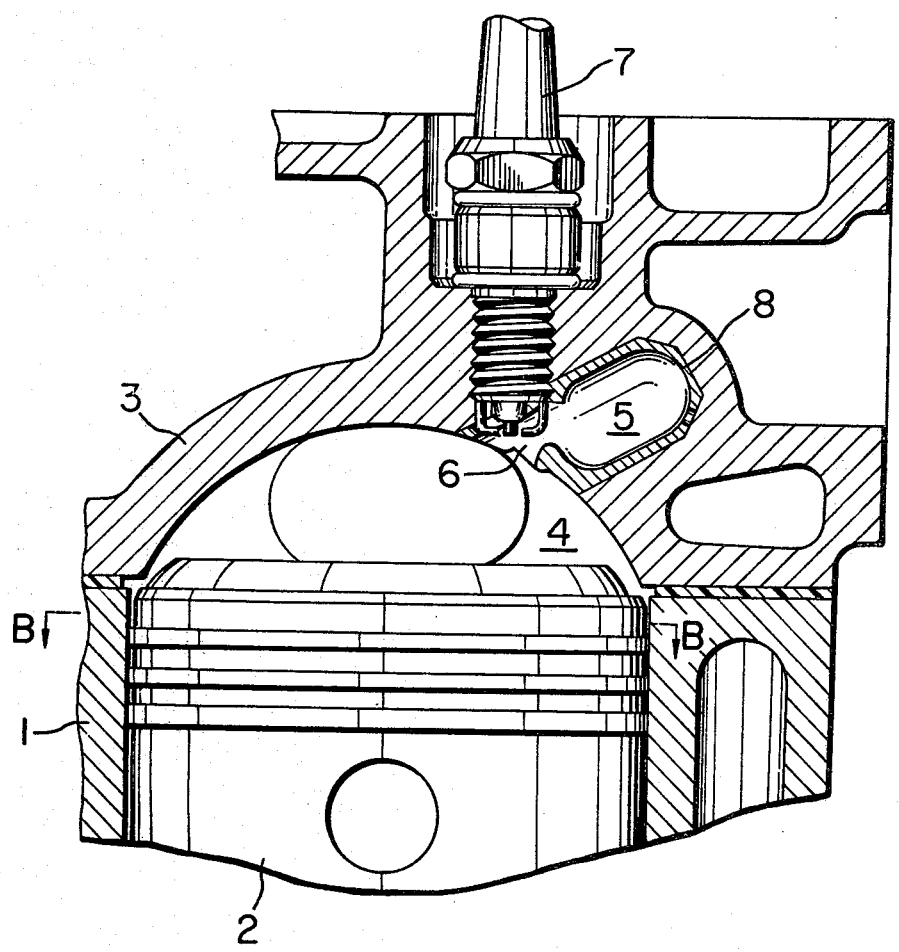
FIG. 1 is a sectional view of the torch ignition type internal combustion engine in accordance with the invention.

Referring to the accompanying drawings and first to FIG. 1, the torch ignition type internal combustion engine according to the present invention includes a cylinder 1 and a piston 2 which is snugly received in the cylinder 1 for reciprocating movement therein in the usual manner. A main combustion chamber 4, which is provided with an intake valve and an exhaust valve (not shown), is defined between the end face of the piston 2 and the cylinder head 3. An auxiliary combustion chamber 5 which is provided in the cylinder head 3 is in communication with the main combustion chamber 4 through a passage 6. An ignition plug 7 has its sparking electrodes located in the passage 6. The auxiliary combustion chamber 5 has a hollow cylindrical body 8 which is fixedly secured to the cylinder head 3, preferably by means of a press-in fit.

The present inventors have found, as a result of a number of experiments conducted on the torch ignition type internal combustion engine with no intake valve in the auxiliary combustion chamber as shown in FIG. 1, that the velocity and amount of the lean air-fuel mixture flowing through the passage 6 into the auxiliary combustion chamber 5 decisively influence the ignition of the mixture by the ignition plug 7. That is, it is considered that, in case the velocity of the flow of mixture in the vicinity of the electrodes of the ignition plug 7 is too fast, the spark by the ignition plug 7 is liable to be blown off and the arc necessary for igniting and burning the mixture can not be maintained. On the other hand, in case the velocity of the flow of mixture is too slow, the sweeping of the flow of mixture in the vicinity of the electrodes of the ignition plug 7 becomes insufficient, whereby the ignitability of the mixture is decreased to a considerable extent due to the gas remaining from the preceding stroke and the growth of the flame core is impeded due to the heat loss by the electrodes.

In order to set the optimum velocity and amount of the flow of mixture through the interconnecting passage 6, the following decisive elements have been adopted and the optimum ranges thereof have been set as follows in the present invention. That is, the elements which have been adopted are; the volume $V_2$ of displacement of the piston, the volume $V_1$ in the auxiliary combustion chamber, the cross-sectional area $A_1$ of the interconnecting chamber, the cross-sectional area $A_1$ of the interconnecting passage, the cross-sectional area $A_2$ of the end face of the piston and the compression ratio $\epsilon_1$.

As the above variables $A_1$, $A_2$ $V_1$, $V_2$ and $\epsilon_1$ are dependent on and influenced by each other, it has been considered difficult to determine optimum values for the variables. The present inventors have succeeded in determining the same as follows.

Figure 2:
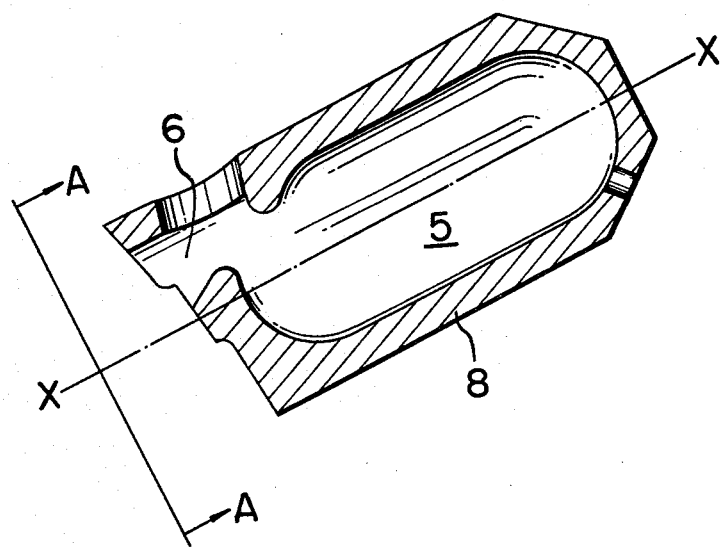
FIG. 2 is a sectional view showing on an enlarged scale the auxiliary combustion chamber of the engine of FIG. 1.
Figure 3:
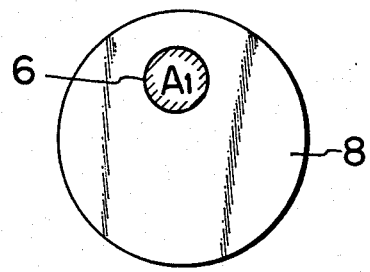
FIG. 3 is a sectional view taken along line A—A of FIG. 2.
Figure 4:
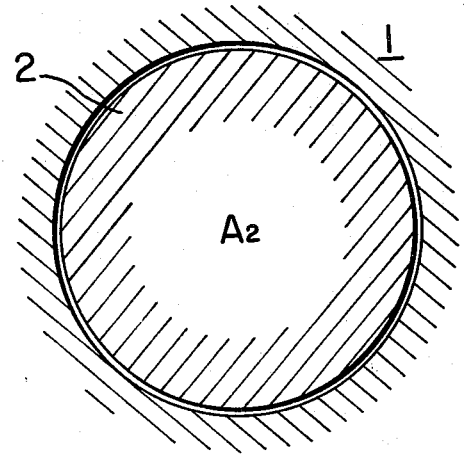
FIG. 4 is a sectional view taken along line B—B of FIG. 1.

Satisfactory results are obtained when the auxiliary combustion chamber 5 of the internal combustion engine of the invention has a cylindrical body 8 with longitudinal axis x—x as shown in FIG. 2 and has a volume $V_1$ of a ratio within the range of 0.0106:1 and 0.0137:1 with respect to $V_2$, the volume of displacement of the piston 2. Furthermore, the cross-sectional area $A_1$ (FIG. 3) of the passage 6 of the engine is in a ratio within the range of 0.009:1 to 0.023:1 with respect to the cross-sectional area $A_2$ (FIG. 4) of the end face of the piston 2. Still furthermore, the compression ratio $\epsilon_1$ is set within the range of 8.0 to 9.5. In this instance, the volume of the auxiliary combustion chamber 5 is part of the clearance volume used in determining the compression ratio $\epsilon_1$.

As discussed hereinbefore, in order to ensure reliable ignition and combustion of the lean air-fuel mixture in the interconnecting passage, it is important to take into consideration the velocity and amount of the flow of mixture therethrough and which is influenced by the volume of the auxiliary combustion chamber, the cross-sectional area of the interconnecting passage and the compression ratio. In the present invention, the volume of the auxiliary combustion chamber is determined in relation to the volume of displacement of the piston and the cross-sectional area of the passage in relation to the area of the end face of the piston to provide a torch ignition type internal combustion engine with no intake valve in the auxiliary combustion chamber which is most stabilized in ignition and combustion under any operating conditions of the engine.

What is claimed is:

1. A torch ignition internal combustion engine of the type which has an auxiliary combustion chamber having a single opening which connects said auxiliary combustion chamber with a main combustion chamber, said engine comprising:
   a cylinder;
   a cylinder head;
   a reciprocable piston in said cylinder, said piston having an end face;
   said main combustion chamber defined between said cylinder head and the end face of said piston and equipped with intake and exhaust valves;
   said auxiliary combustion chamber located in the cylinder head;
   a passage directly fluidly interconnecting said main and auxiliary combustion chambers, said passage progressively increasing in transverse cross-sectional area in a direction from adjacent the auxiliary combustion chamber, where the passage is of smallest transverse cross-sectional area and of a ratio within the range of 0.009:1 to 0.023:1 with respect to the cross-sectional area of said end face of said piston; and
   an ignition plug having sparking electrodes located in said passage in a region beyond that of smallest transverse cross-sectional area in a direction towards said main combustion chamber.

2. A torch ignition internal combustion engine as defined in claim 1, wherein said auxiliary combustion chamber is defined by a hollow cylindrical body made of heat resistant material.

3. A torch ignition internal combustion engine as defined in claim 2, wherein said hollow cylindrical body of said auxiliary combustion chamber is press fitted in the cylinder head.